(12) United States Patent  (10) Patent No.: US 8,431,860 B2
Ushimaru  (45) Date of Patent: Apr. 30, 2013

(54) WELDING METHOD AND WELDING APPARATUS

(75) Inventor: Akihiko Ushimaru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 250 days.

(21) Appl. No.: 12/823,532

(22) Filed: Jun. 25, 2010

(65) Prior Publication Data

US 2010/0326968 A1 Dec. 30, 2010

(30) Foreign Application Priority Data

Jun. 29, 2009 (JP) .................................. 2009-153607

(51) Int. Cl.
*B23K 26/00* (2006.01)

(52) U.S. Cl.
USPC .................. 219/121.64; 219/121.63; 29/650; 29/825

(58) Field of Classification Search ............ 219/121.63, 219/121.64; 29/650, 825
See application file for complete search history.

(56) References Cited

U.S. PATENT DOCUMENTS

| | | | |
|---|---|---|---|
| 5,893,959 | A | 4/1999 | Muellich |
| 6,444,946 | B1 | 9/2002 | Korte |
| 6,528,755 | B2 | 3/2003 | Grewell et al. |

FOREIGN PATENT DOCUMENTS

| | | | |
|---|---|---|---|
| JP | 9-510930 | A | 11/1997 |
| JP | 2000-334589 | A | 12/2000 |
| JP | 2001-334578 | | * 12/2001 |
| JP | 2003-225946 | A | 8/2003 |
| JP | 2003-530240 | A | 10/2003 |
| JP | 2005-231172 | | * 9/2005 |
| JP | 2007-175901 | A | 7/2007 |
| JP | 2009-012239 | A | 1/2009 |

OTHER PUBLICATIONS

Japanese Office Action dated Mar. 5, 2013 issued in corresponding Japanese Patent Application No. 2009-153607 (w/Partial English translation) (4 pages total).

\* cited by examiner

*Primary Examiner* — Tan N Tran

(74) *Attorney, Agent, or Firm* — Westerman, Hattori, Daniels & Adrian, LLP

(57) ABSTRACT

A welding method includes sandwiching a first base material and a second base material between a first block and a second block, the first and second base materials being made of a light-transmitting resin, and welding the first and second base materials to each other by making a laser beam enter the second base material through a front surface of the second base material toward the first block from outside an outline of the second block at an acute entry angle with respect to the front surface of the second base material and by focusing the laser beam on the first and second base materials between the first and second blocks.

9 Claims, 15 Drawing Sheets

WELDING METHOD AND WELDING APPARATUS

CROSS-REFERENCE TO RELATED APPLICATIONS

This application is based upon and claims the benefit of priority of the prior Japanese Patent Application No. 2009-153607, filed on Jun. 29, 2009, the entire contents of which are incorporated herein by reference.

FIELD

The embodiments discussed herein are related to a welding apparatus.

BACKGROUND

When welding transparent resin films to each other, the resin films are sandwiched between blocks. Thus, the resin films are stacked on top of each other with a predetermined pressing force. An absorber for absorbing a laser beam is applied to an interface between the resin films beforehand. A laser beam is emitted from outside the outline of the blocks toward the interface in a direction perpendicular to the front surfaces of the resin films. The absorber absorbs the laser beam. As a result, the resin films are heated to the melting point of the resin films at the interface, and the resin films melt. Thereafter, the resin films are cooled, so that the resin films become welded to each other. (See Japanese Laid-open Patent Publication Nos. 2000-334589, 9-510930, 2007-175901, 2009-12239, and 2003-530240.)

The laser beam melts the resin films while the laser beam is moved parallel to the front surfaces of the resin films. Because the laser beam enters the resin films from a direction perpendicular to the front surfaces of the resin films, the blocks are disposed so as to apply a pressing force to the resin films in an area that does not include positions at which the laser beam enters the resin films. As a result, a sufficient pressing force is not applied to the resin films at melting positions of the resin films. The resin films do not sufficiently contact each other at the melting position. Moreover, it is necessary to apply the absorber to the interface between the resin films beforehand. The cost of welding increases due to the use of the absorber.

SUMMARY

According to an embodiment, a welding method includes sandwiching a first base material and a second base material between a first block and a second block, the first and second base materials being made of a light-transmitting resin, and welding the first and second base materials to each other by making a laser beam enter the second base material through a front surface of the second base material toward the first block from outside an outline of the second block at an acute entry angle with respect to the front surface of the second base material and by focusing the laser beam on the first and second base materials between the first and second blocks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
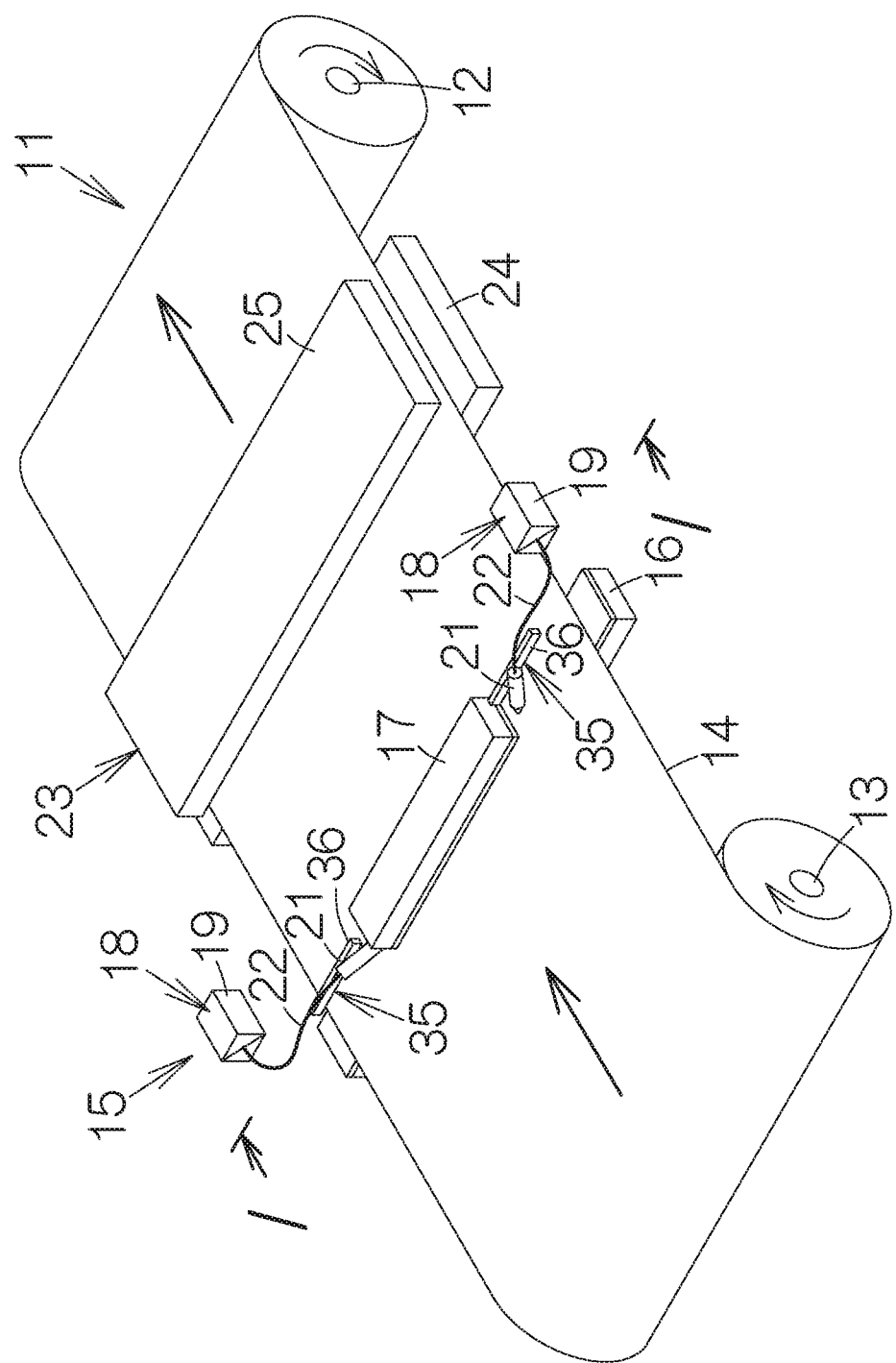
FIG. 1 illustrates the structure of a manufacturing apparatus according to an embodiment.

FIG. 1 illustrates the structure of a manufacturing apparatus 11 according to an embodiment. The manufacturing apparatus 11 manufactures liquid crystal devices including flat display devices such as electronic paper. The manufacturing apparatus 11 includes a winding reel 12 and a feed reel 13. The axis of the winding reel 12 extends parallel to the axis of the feed reel 13. A roll material 14, which is a film-like base material, is wound around the winding reel 12 and the feed reel 13. When the winding reel 12 rotates to take up the roll material 14, the feed reel 13 feeds the roll material 14 by a predetermined feed amount. The roll material 14 extends horizontally between the winding reel 12 and the feed reel 13.

One roll of the roll material 14 has a length of, for example, 100 m, in the direction in which the roll material 14 is fed. The roll material 14 has a width of, for example, 0.3 m in the direction parallel to the axial direction of the winding reel 12. The roll material 14, which is wound around the feed reel 13, includes a backing and a conductive layer. The conductive layer is a solid layer formed on a front surface of the backing. The backing and the conductive layer are flexible. The backing is made of a resin film, such as a light-transmissive polycarbonate film, having a thickness of about 120 μm. The melting point of the polycarbonate is, for example, about 240° C. The conductive layer is, for example, a light-transmissive indium oxide layer having a thickness of about 130 nm. An example of the indium oxide include indium tin oxide (ITO).

The manufacturing apparatus 11 includes a welding apparatus 15 disposed between the feed reel 13 and the winding reel 12. The welding apparatus 15 includes a lower block 16, which corresponds to a first block, and an upper block 17, which corresponds to a second block. An upper surface of the lower block 16 faces the lower surface of the upper block 17. The roll material 14 extends horizontally between the upper surface of the lower block 16 and the lower surface of the upper block 17. The width of the upper block 17 along the width of the roll material 14 is smaller than the width of the lower block 16 along the width of the roll material 14. Thus, parts of the upper surface of the lower block 16 outside the ends of the upper block 17 in the width direction of the roll material 14 are exposed to the outside.

The welding apparatus 15 includes a pair of laser beam emitting units 18 that are disposed at positions outside the ends of the upper block 17 in the width direction. Each of the laser beam emitting units 18 includes a light source, that is, a laser diode (LD) 19. In the present embodiment, each of the laser diodes 19 can emit a continuous-wave laser beam having a wavelength of, for example, about 1.55 µm. The output power of the laser beam is, for example, about 10 W. Optical units 21 are connected to the laser diodes 19. Optical fibers 22 having flexibility are used for the connection. The optical fibers 22 guide the laser beams from the laser diodes 19 to the optical units 21. The optical units 21 emit the laser beams from the leading ends thereof, that is, the lower ends thereof.

The manufacturing apparatus 11 includes a patterning mechanism 23 that is disposed between the welding apparatus 15 and the winding reel 12. The patterning mechanism 23 includes a stage 24, which receives the back surface of the roll material 14, and an apparatus body 25, which faces the front surface of the roll material 14. The apparatus body 25 forms a resist layer on the front surface of the roll material 14, which is received by the stage 24, by performing, for example, exposure and development processing. The apparatus body 25 etches the conductive layer using the resist layer. Thus, parts of the conductive layer outside the outline of the resist layer are etched. Subsequently, the apparatus body 25 rinses the roll material 14. With such processes, a conductor pattern for liquid crystal is formed on the backing of the roll material 14. The conductor pattern includes, for example, transparent electrodes and a wiring pattern.

Figure 2:
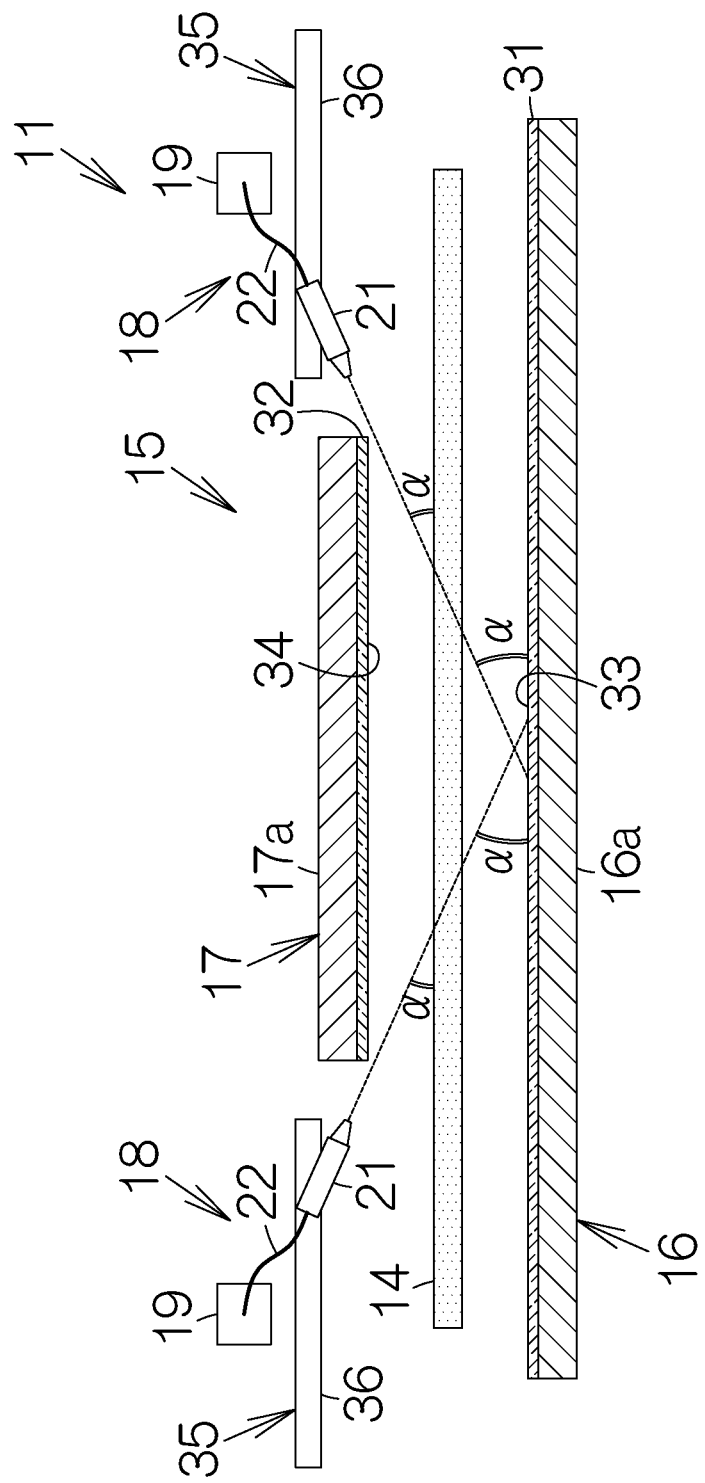
FIG. 2 illustrates a section taken along line I-I of FIG. 1.

FIG. 2 schematically illustrates the structure of the welding apparatus 15 according to a first embodiment. Referring to FIG. 2, when the lower block 16 and the upper block 17 are in retracted positions, the upper surface of the lower block 16 and the lower surface of the upper block 17 are respectively separated from the back surface and the front surface of the roll material 14 by predetermined distances. Metal layers 31 and 32, which have predetermined thicknesses, are respectively formed on an upper surface of a block body 16a of the lower block 16 and on a lower surface of a block body 17a of the upper block 17. The metal layers 31 and 32 are made of a metal such as aluminum. Reflective surfaces 33 and 34, which are flat, are respectively formed on front surfaces of the metal layers 31 and 32. The reflective surfaces 33 and 34 extend parallel to each other. The reflective surfaces 33 and 34 are capable of reflecting a laser beam. In the first embodiment, the reflective surfaces 33 and 34 are mirror surfaces.

When the optical units 21 are at home positions, the optical units 21 are tilted with respect to the front surface of the roll material 14. Moving from the upper ends of the optical units 21 to the lower ends of the optical units 21, the distances between the optical units 21 and the upper block 17 decrease. As a result, the optical axes of the optical units 21 intersect the reflective surface 33 of the lower block 16 at a predetermined intersection angle α. Thus, the optical units 21 can emit laser beams toward the reflective surface 33 at an entry angle α. Thus, the optical units 21 can make the laser beams enter the roll material 14 through the front surface of the roll material 14 at the entry angle α. The entry angle α is an acute angle larger than 0 degrees. In particular, it is preferable that the entry angle α be in the range of, for example, 15 to 60 degrees. The entry angle α is not an angle at which the laser beam is totally internally reflected by the front surface of the roll material 14.

The lower block 16 can move from the retracted position in a direction perpendicular to the front surface of the roll material 14. Likewise, the upper block 17 can move from the retracted position in a direction perpendicular to the front surface of the roll material 14. Thus, the blocks 16 and 17 move to contact positions at which the reflective surfaces 33 and 34 respectively contact the back surface and the front surface of the roll material 14. When the blocks 16 and 17 are at the contact positions, the roll material 14 is sandwiched between the reflective surfaces 33 and 34. Moreover, the blocks 16 and 17 can be separated from the contact positions toward the retracted positions. The movements of the blocks 16 and 17 between the retracted positions and the contact positions are realized by using, for example, air cylinders (not shown).

The optical units 21 can move horizontally and parallel to the front surface of the roll material 14. During the movement, the optical units 21 maintain the tilted positions. Drive mechanisms 35 are connected to the optical units 21 in order to move the optical units 21. The drive mechanisms 35 include rails 36 that guide the movements of the optical units 21. The rails 36 extend parallel to the front surface of the roll material 14 and in the width direction of the roll material 14. Thus, the optical units 21 can be moved in the width direction of the roll material 14 so as to be away from the home positions and back to the home positions. The speeds of the optical units 21 are, for example, about 20 mm/s. Such movements of the optical units 21 are realized by using, for example, stages (not shown).

Figure 3:
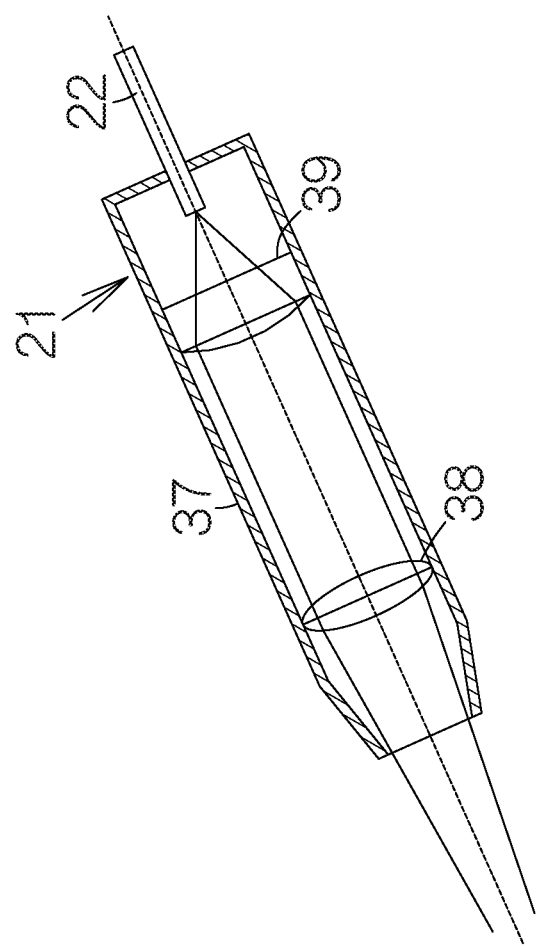
FIG. 3 schematically illustrates the structure of an optical unit.

As illustrated in FIG. 3, the optical unit 21 includes, for example, a housing 37 having a hollow cylindrical shape. A leading end of the optical fiber 22 is connected to an upper end of the housing 37. A converging lens 38 is disposed in a lower end portion of the housing 37. A collimating lens 39 is disposed between the converging lens 38 and the optical fiber 22. The collimating lens 39 converts a divergent laser beam, which is supplied from the leading end of the optical fiber 22, to a collimated laser beam. The converging lens 38 converges the collimated laser beam, which is supplied from the collimating lens 39, to a convergent laser beam. The optical axes of the optical fiber 22, the converging lens 38, and the collimating lens 39 are the same. In first embodiment, the converging lens 38 has a focal length of, for example, 75 mm.

In the following description, it is assumed that the manufacturing apparatus 11 manufactures electronic paper. The roll material 14 is mounted on the feed reel 13. The roll material 14 is fed from the feed reel 13 by a predetermined feed amount and wound around the winding reel 12. Thus, the winding reel 12 winds the roll material 14. After the winding reel 12 stops winding, the patterning mechanism 23 forms a conductor pattern for liquid crystal on the front surface of the backing of the roll material in a predetermined region of the roll material 14 in accordance with the patterning on the conductive layer. The roll material 14 is wound around the winding reel 12 by a predetermined winding amount. The patterning mechanism 23 forms a conductor pattern every time the winding reel 12 winds the roll material 14.

When the roll material 14 has been completely fed from the feed reel 13, the lower block 16 of the welding apparatus 15 moves up from the retracted position to the contact position.

Figure 4:
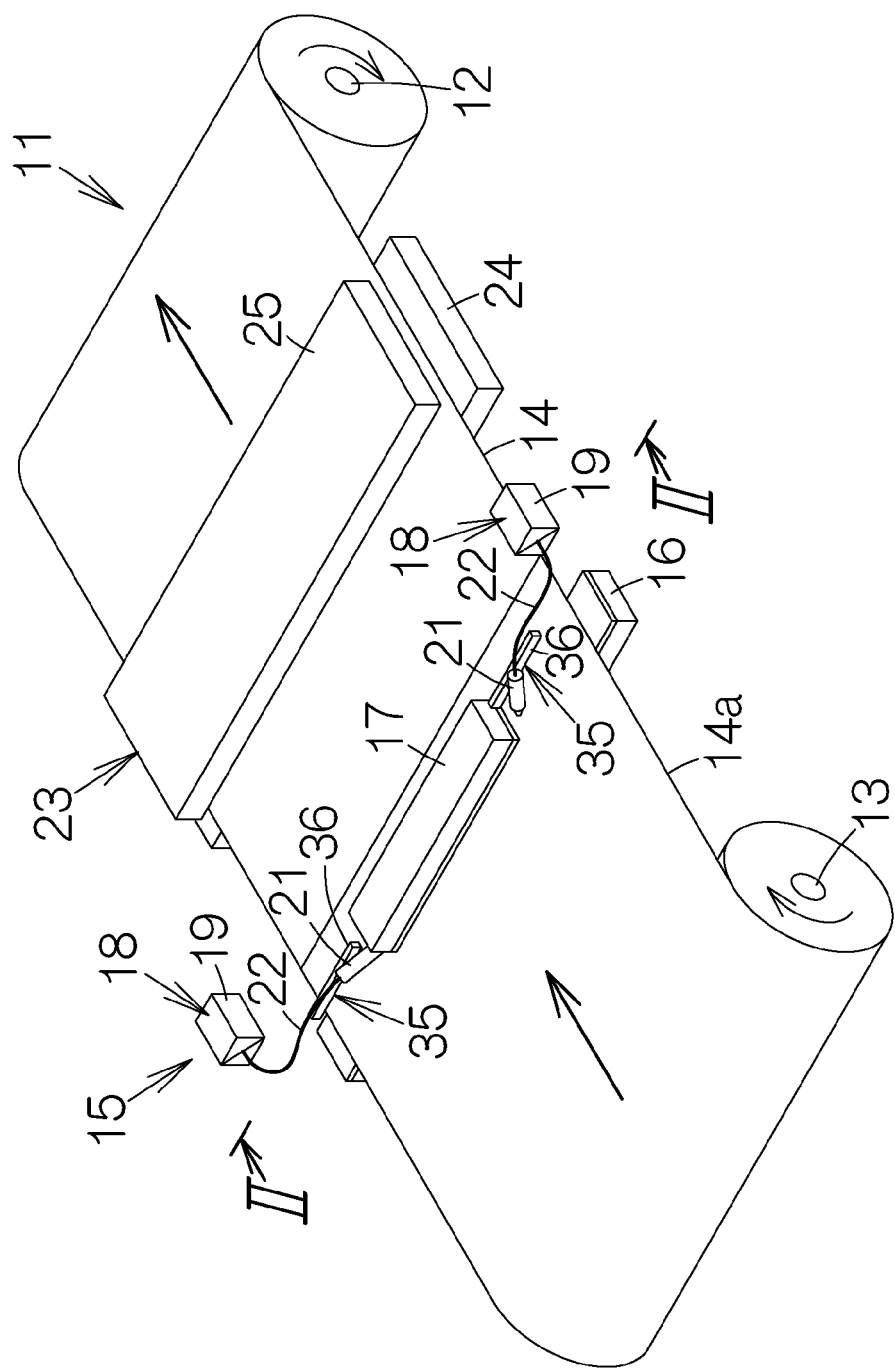
FIG. 4 illustrates a process in which a leading end of a second base material is superposed on a trailing end of a first base material.

As a result, a back surface of a trailing end of the roll material 14 is received by the reflective surface 33 of the lower block 16. As illustrated in FIG. 4, a new roll material 14a is mounted on the feed reel 13. A leading end of the roll material 14a, which is mounted on the feed reel 13, is fed onto the lower block 16, for example, manually by an operator. Thus, the back surface of the leading end of the roll material 14a is superposed on the front surface of the trailing end of the roll material 14 on the lower block 16.

Figure 5:
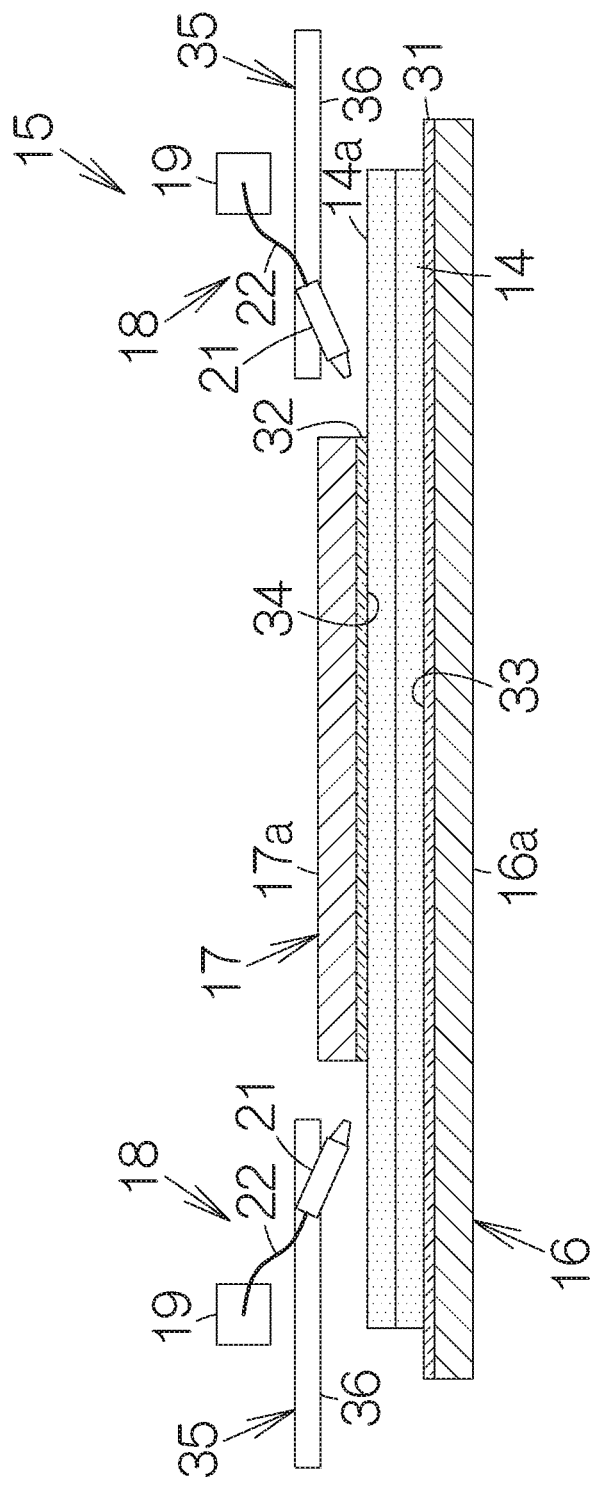
FIG. 5 illustrates a section taken along line II-II of FIG. 4.

As illustrated in FIG. 5, when the upper block 17 moves down from the retracted position to the contact position, the reflective surface 34 of the upper block 17 is received on the roll material 14a. Thus, the upper block 17 presses the roll materials 14 and 14a against the lower block 16 with a predetermined pressing force. The pressing force is, for example, about 20 N. Thus, the roll materials 14 and 14a are sandwiched between the reflective surfaces 33 and 34. At this time, the optical units 21 are located at the home positions. At the home positions, the optical units 21 are nearest to each other along the width of the upper block 17.

Figure 6:
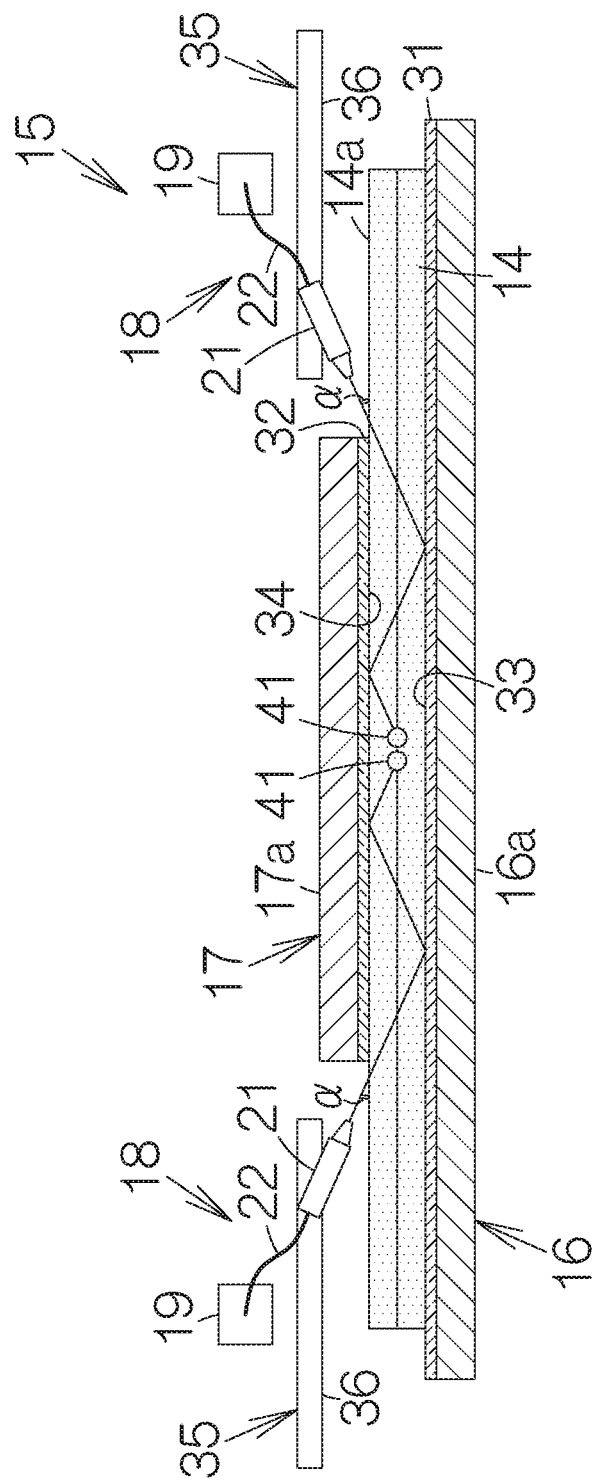
FIG. 6 illustrates a process in which laser beams are focused on an interface between the first base material and the second base material between the first block and the second block.

As illustrated in FIG. 6, the optical units 21 emit laser beams at the home positions. From outside the outline of the reflective surface 34, the laser beams enter the roll material 14a through the front surface of the roll material 14a at the entry angle α. The laser beams, which have entered the roll materials 14 and 14a, are reflected by the reflective surface 33 of the lower block 16. The reflected laser beams are reflected by the reflective surface 34 of the upper block 17. The focal length of the converging lens 38 has been set with consideration of reflection by the reflective surfaces 33 and 34, so that the laser beams are focused on the interface between the roll materials 14 and 14a. Thus, the laser beams are focused at focal points between the blocks 16 and 17. The roll materials 14 and 14a are heated at the focal points of the laser beams. The heating temperature is equal to or higher than the melting points of the roll materials 14 and 14a, that is, about 300 degrees. As a result, the roll materials 14 and 14a melt at the interface.

Figure 7:
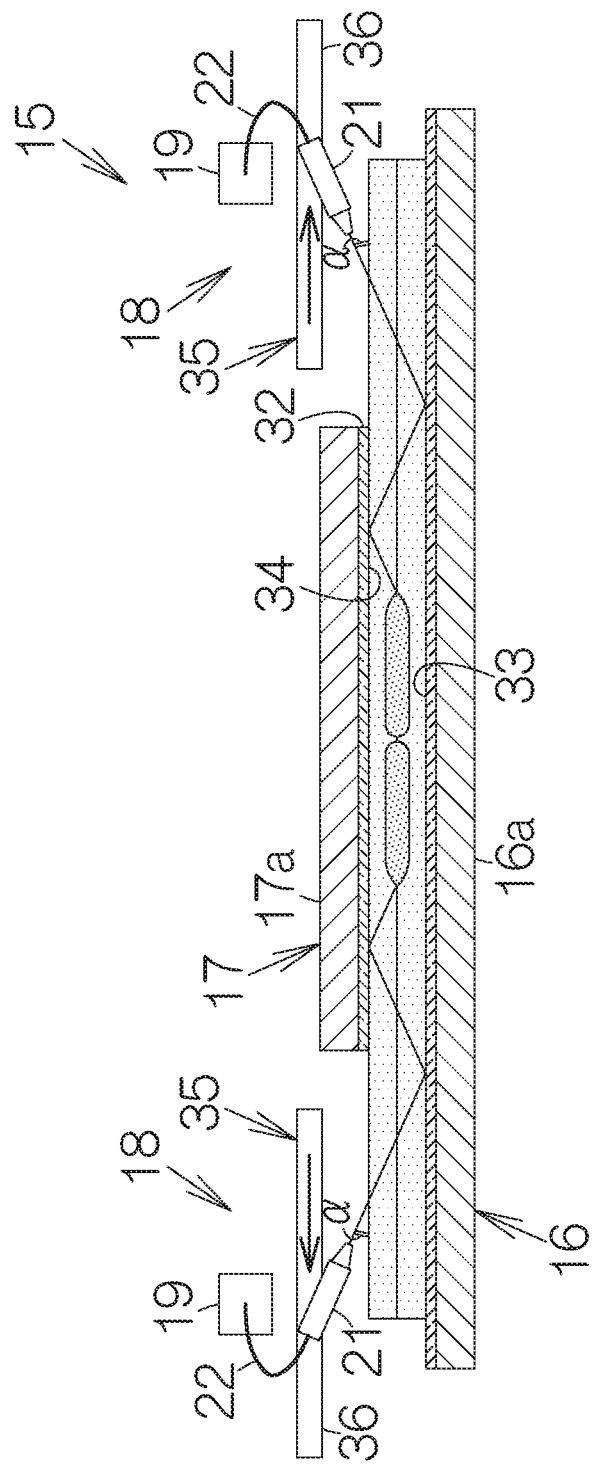
FIG. 7 illustrates a process in which the focal points of the laser beams are moved along the interface.

When melting starts, cores 41, which are melted regions, are formed between the roll materials 14 and 14a. Due to melting, the color of the roll materials 14 and 14a in the cores 41 changes from, for example, clear to white. As a result, the cores 41 can absorb the laser beams. At this time, the optical units 21 start moving from the home positions parallel to the front surface of the roll material 14a. As illustrated in FIG. 7, the optical units 21 move away from each other. The focal points of the laser beams move along the interface between the roll materials 14 and 14a. As the focal points move, the roll materials 14 and 14a become melted along the interface. At this time, as the laser beams are absorbed by the cores 41, melting of the roll materials 14 and 14a progresses from the cores 41 along the paths of the focal points of the laser beams.

Figure 8:
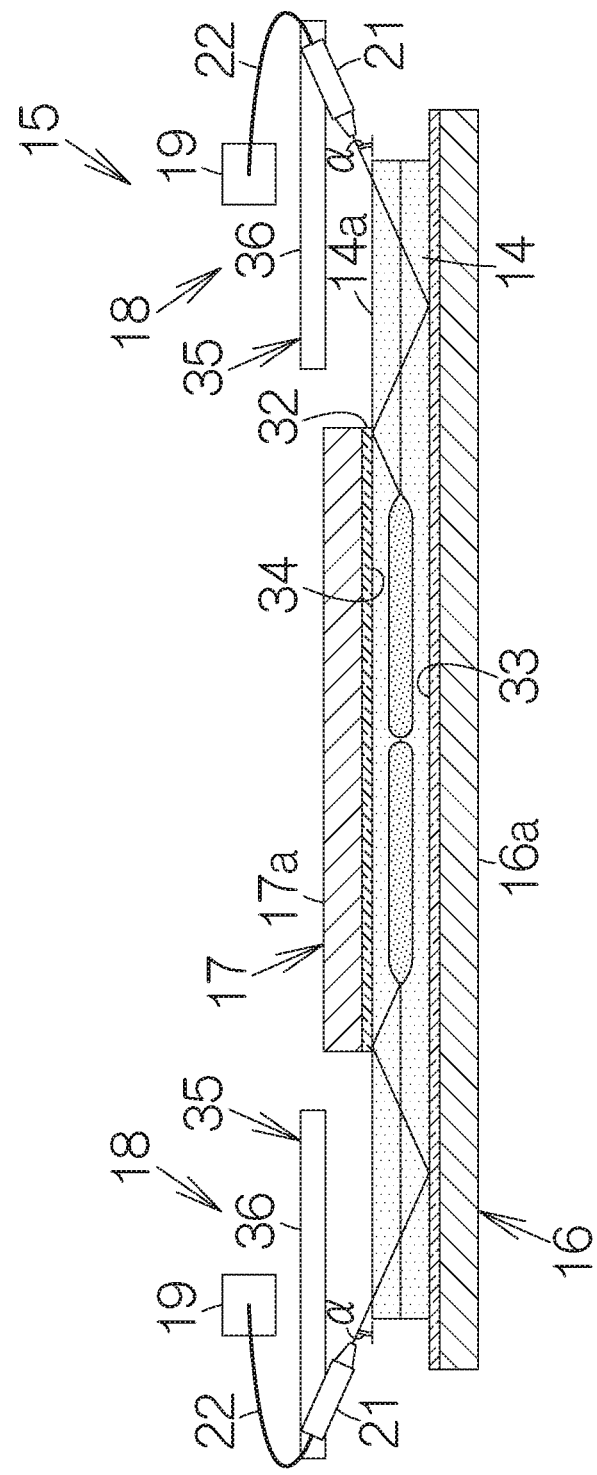
FIG. 8 illustrates a process in which the focal points of the laser beams are moved along the interface.

As illustrated in FIG. 8, when the optical units 21 reach the predetermined end points, emission of the laser beams is stopped. After the emission of the laser beams is stopped, the temperature of the roll materials 14 and 14a returns to room temperature. Because the blocks 16 and 17 apply a pressing force so that the roll materials 14 and 14a closely contact each other, the roll materials 14 and 14a are securely joined to each other at the interface. Subsequently, the blocks 16 and 17 move away from the back surface of the roll material 14 and the front surface of the roll material 14a toward the retracted positions. The winding reel 12 winds the roll material 14 by a predetermined winding amount. Thus, the new roll material 14a is disposed on the patterning mechanism 23. A conductor pattern for liquid crystal is formed from the conductive layer on the backing of the roll material 14a.

Figure 9:
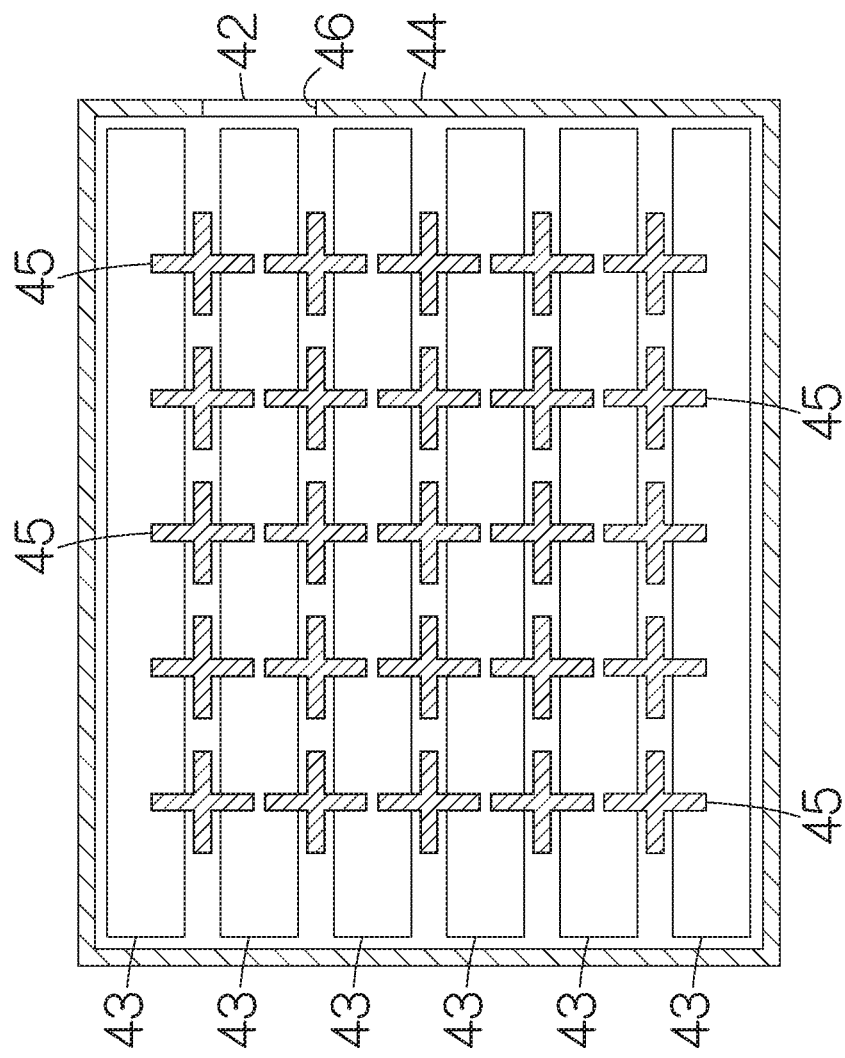
FIG. 9 illustrates a process in which liquid crystal is poured into a space between base material films.

After the roll materials 14 and 14a have been welded to each other and the winding reel 12 has wound the roll material 14a by a predetermined amount, the roll material 14a is cut in the width direction. The roll material 14 is removed from the winding reel 12. Subsequently, the roll material 14a is wound around the winding reel 12. Base material films for electronic paper having a predetermined size are cut from the roll material 14, which has been removed from the winding reel 12. As illustrated in FIG. 9, a plurality of transparent electrodes 43 are formed on the front surface of a base material film 42 in accordance with the aforementioned patterning. The transparent electrodes 43 that are adjacent to each other extend parallel to each other.

Subsequently, one base material film 42 is attached to another base material film 42. When the front surface of one base material film 42 is superposed on the front surface of another base material film 42, the transparent electrodes 43 of the other base material film 42 extend perpendicular to the transparent electrodes 43 of the one base material film 42. The base material films 42 are joined to each other using a sealing member 44 and columnar members 45. The sealing member 44 extends along the outline of the front surface of the base material film 42. The columnar members 45 are surrounded by the sealing member 44 and arranged in a matrix pattern. The sealing member 44 has an opening 46. A section divided by four adjacent columnar members 45 corresponds to one pixel. The sealing member 44 and the columnar members 45 are made of, for example, a UV-curable resin.

Subsequently, liquid crystal (not shown) is poured into the opening 46 of the sealing member 44. For example, cholesteric liquid crystal is used as the liquid crystal. Thus, a laminate of the base material films 42 is formed. For example, a black light absorbing layer (not shown) is attached to the back surface of the laminate. Thus, electronic paper is manufactured. Such electronic paper displays, for example, a monochrome image. Electronic paper may include a laminate of, for example, three layers. Cholesteric liquid crystals in the layers emit, for example, red, green, and blue light, which are three primary colors. Such electronic paper displays a color image.

In the manufacturing apparatus 11, the laser beams enter the roll material 14a through the front surface of the roll material 14a at the acute entry angle α. The laser beams are reflected by the reflective surfaces 33 and 34, and the laser beams are focused on the interface between the roll materials 14 and 14a. The front surfaces of the roll materials 14 and 14a are flatter than, for example, side surfaces of the roll materials 14 and 14a. The side surfaces of the roll materials 14 and 14a are not flat because the side surfaces are formed by cutting. As a result, dispersion and refraction of the laser beams are greatly reduced as compared with a case in which the laser beams enter the roll materials 14 and 14a through the side surfaces of the roll materials 14 and 14a along the interface. The laser beams reach the interface with high precision, so that welding can be performed efficiently. Moreover, the cost of welding is reduced because it is not necessary to dispose the absorber of the laser beam on the interface.

In addition, the laser beams enter the roll materials 14 and 14a through the front surface of the roll material 14a from outside the outline of the reflective surface 34. The laser beams are reflected by the reflective surfaces 33 and 34, so that the laser beams are securely guided between the reflective surfaces 33 and 34. Thus, the focal points of the laser beams are securely located between the blocks 16 and 17. The blocks 16 and 17 can securely apply a pressing force to the positions of the roll materials 14 and 14a at which the roll materials 14 and 14a are welded to each other. The roll materials 14 and 14a closely contact each other, so that the precision of welding is increased.

In the first embodiment, as described above, the laser beams enter the roll material 14a through the front surface of the roll material 14a at the entry angle α. In an existing comparative example, the laser beams enter through the side surfaces of the roll materials 14 and 14a toward the interface between the roll materials 14 and 14a. In the first embodiment and in the comparative example, the power and the focal length of the laser beam are the same those described above. Under such conditions, the movement speeds of the optical units 21 were measured. With the first embodiment, the roll materials 14 and 14a were welded to each other at the speed of 20 mm/s. In contrast, with the comparative example, the roll materials 14 and 14a were welded to each other at the speed of 1 mm/s. It was demonstrated that the efficiency of welding with the first embodiment is substantially improved as compared with the comparative example.

Figure 10:
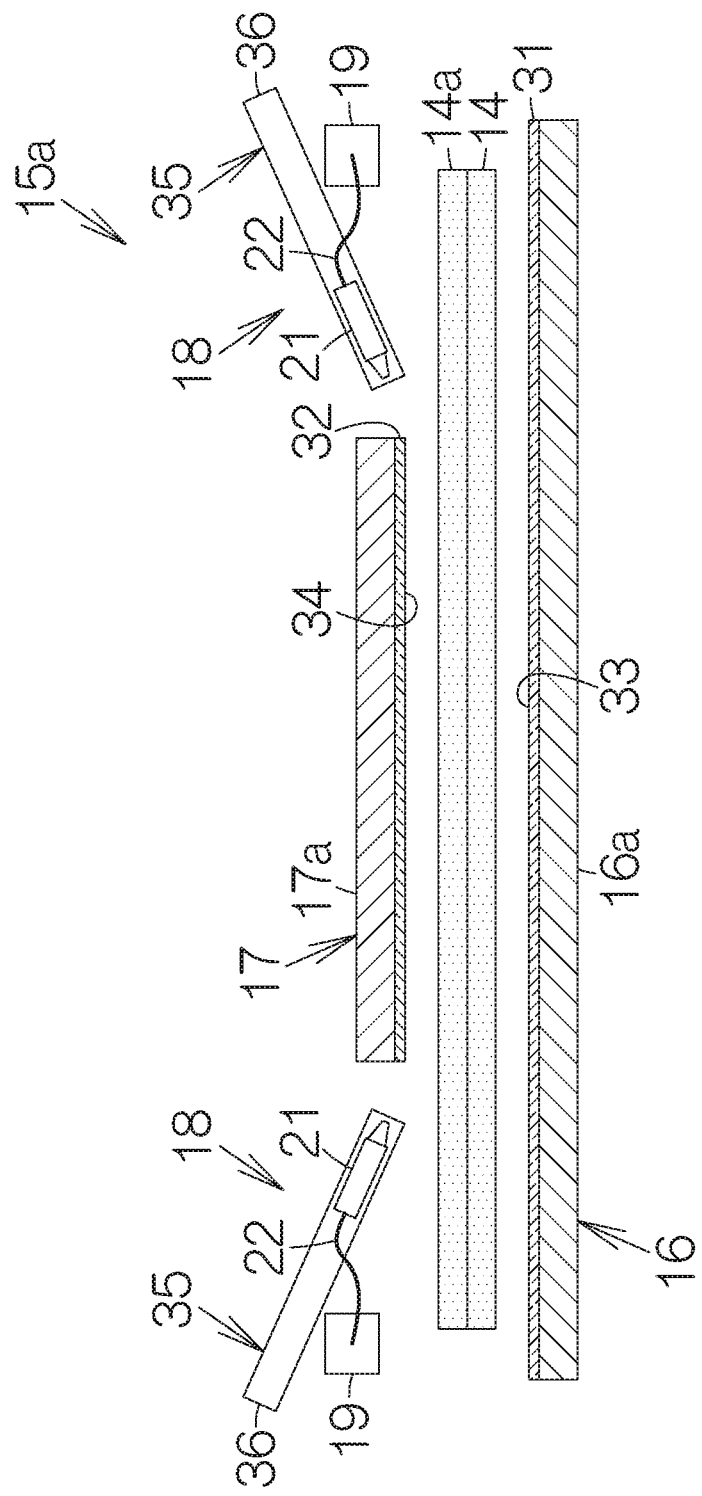
FIG. 10 illustrates the structure of a welding apparatus according to a second embodiment.

FIG. 10 schematically illustrates the structure of a welding apparatus 15a according to a second embodiment. In the welding apparatus 15a, the optical units 21 can move from the home positions along the optical axes of the laser beams. During the movement, the optical units 21 maintain the tilted positions. In order to realize the movement, the rails 36 of the drive mechanism 35 extend parallel to the optical axes of the laser beams. As a result, the optical units 21 move away from the front surface of the roll material 14 as the optical units 21 move outward along the width of the roll material 14. Thus, the optical units 21 can move away from the home positions and return to the home positions. Components and structures that are equivalent to those of the welding apparatus 15 of the first embodiment will be denoted by the same numerals.

Figure 11:
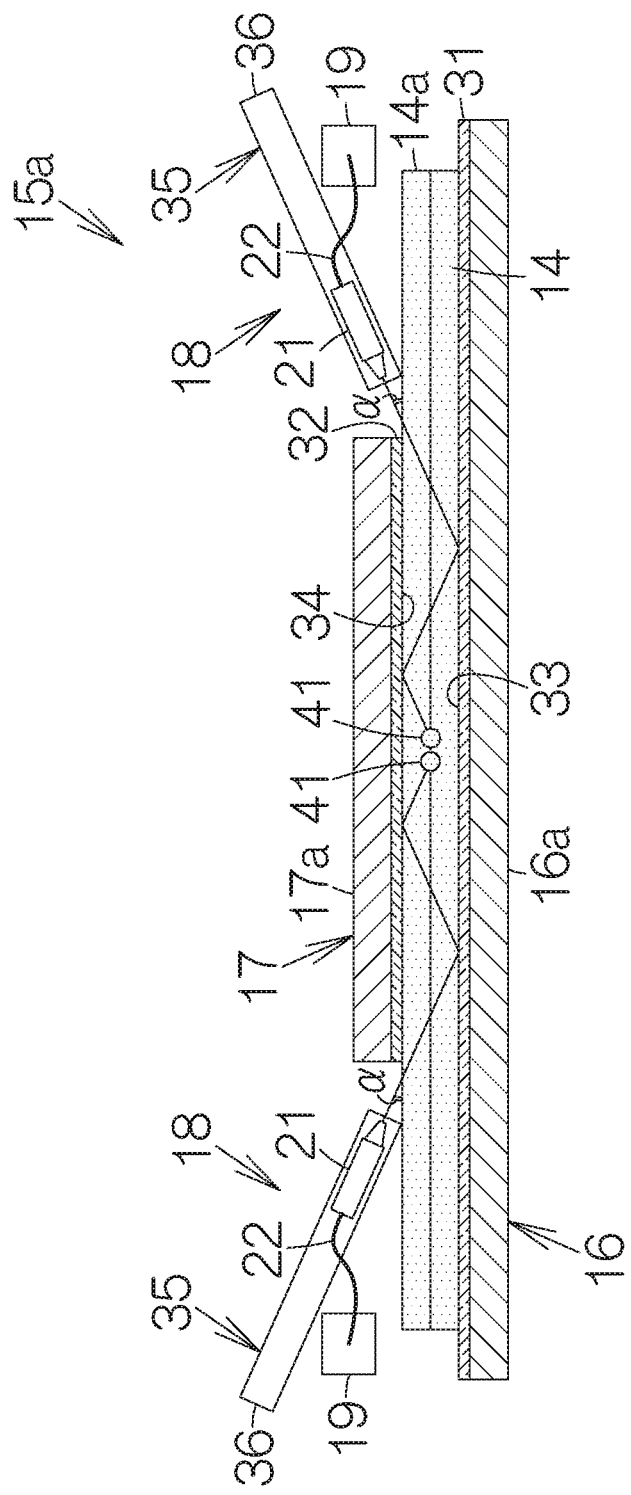
FIG. 11 illustrates a process in which laser beams are focused on an interface between the first base material and the second base material between the first block and the second block.

It is assumed that the roll materials 14 and 14a are welded to each other using the welding apparatus 15a. As with the first embodiment, the trailing end of the roll material 14 and the leading end of the new roll material 14a are superposed on the reflective surface 33 of the lower block 16. The reflective surface 34 of the upper block 17 is received on the roll material 14a. At this time, as illustrated in FIG. 11, the optical units 21 emit laser beams at the home positions. The laser beams enter the roll material 14a from the front surface of the roll material 14a at the entry angle α. The laser beams are reflected by the reflective surfaces 33 and 34. When the optical units 21 are at the home positions, the laser beams are focused on the interface between the roll materials 14 and 14a. The roll materials 14 and 14a are heated at the focal points of the laser beams.

Figure 12:
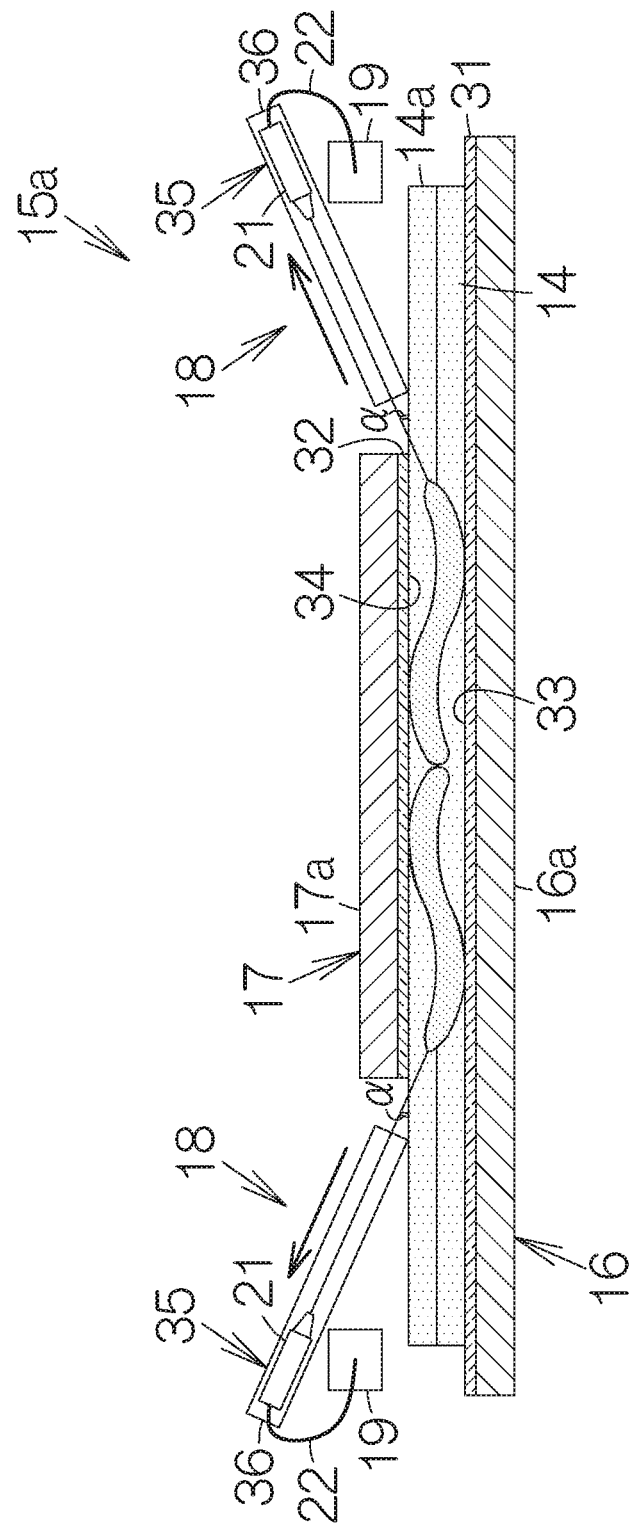
FIG. 12 illustrates a process in which the focal points of the laser beams are moved along the optical axis of the laser beam.

When melting starts at the interface between the roll materials 14 and 14a, the cores 41 are formed between the roll materials 14 and 14a, as with the first embodiment. At this time, the optical units 21 start moving along the optical axes from the home positions. Because the focal lengths of the laser beams are constant, as illustrated in FIG. 12, the focal points of the laser beams move in the roll materials 14 and 14a along paths that meander. As the focal points move, the roll material 14 and 14a become melted from the cores 41 along the paths of the focal points of the laser beams. At this time, as the laser beams are absorbed by the cores 41, melting of the roll materials 14 and 14a progresses from the cores 41 along the paths of the focal points of the laser beams. The roll materials 14 and 14a are efficiently melted. When the roll materials 14 and 14a are cooled, the roll materials 14 and 14a are securely joined to each other at the interface.

In the welding apparatus 15a, as with the first embodiment, the laser beams enter the roll material 14a through the front surface of the roll material 14a at an acute entry angle α. Therefore, dispersion and refraction of the laser beams are reduced as compared with a case in which the laser beams enter the roll materials 14 and 14a through the side surfaces of the roll materials 14 and 14a along the interface. The laser beams can reach the interface with high precision, so that welding can be performed efficiently. Moreover, the cost of welding is reduced because it is not necessary to dispose the absorber of the laser beam on the interface. In addition, the laser beams enter the roll materials 14 and 14a through the front surfaces of the roll material 14a from outside the outline of the reflective surface 34. At the positions corresponding to the focal points, the blocks 16 and 17 can securely apply a pressing force to the roll materials 14 and 14a. The roll materials 14 and 14a closely contacts each other.

Figure 13:
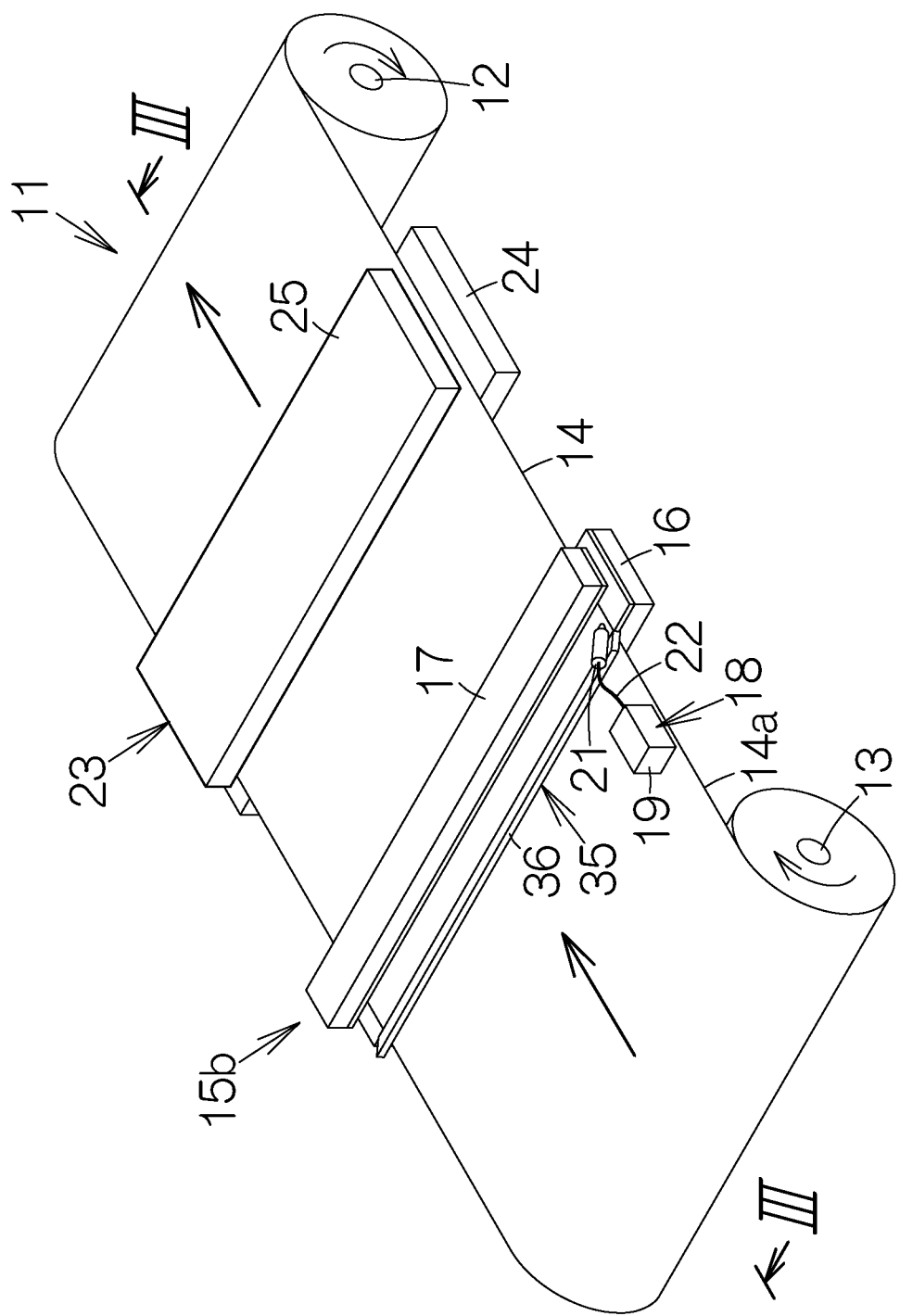
FIG. 13 illustrates the structure of a welding apparatus according to a third embodiment.
Figure 14:
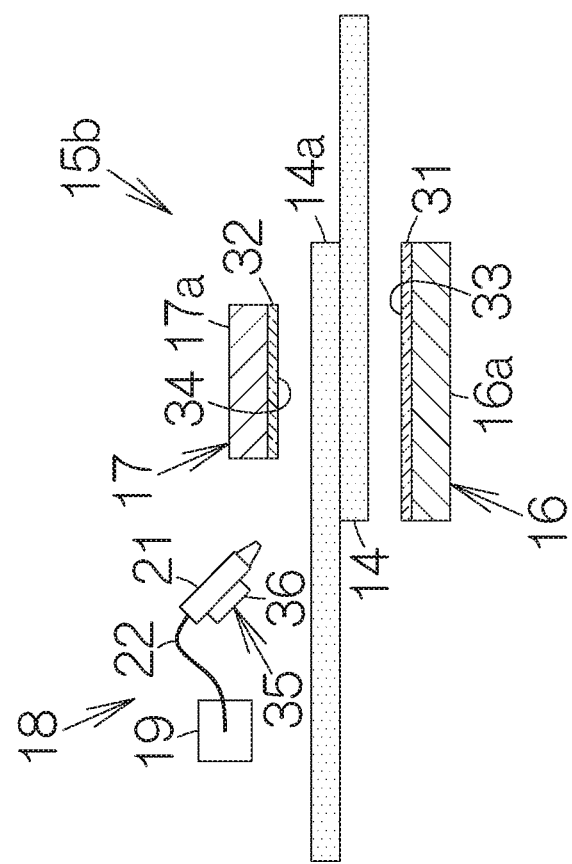
FIG. 14 illustrates a section taken along line III-III of FIG. 13.

FIG. 13 illustrates the structure of a welding apparatus 15b according to a third embodiment. The welding apparatus 15b includes one laser beam emitting unit 18 instead of the pair of laser beam emitting units 18 described above. In the welding apparatus 15b, the optical unit 21 is disposed along a side edge of the upper block 17. Referring to FIG. 14, the length of the upper block 17 along the feed direction of the roll material 14 is smaller than the length of the lower block 16 along the feed direction of the roll material 14. The widths of the blocks 16 and 17 along the width of the roll material 14 may be the same.

The optical unit 21 is tilted as with the first and second embodiments. Moving from the upper end of the optical unit 21 to the lower end of the optical unit 21, the distance between the optical unit 21 and the side edge of the upper block 17 decreases. When the optical unit 21 is at the home position, the optical unit 21 is located near to an end of upper block 17 along the width of the roll material 14. The optical unit 21 can move along the width of roll material 14 while extending parallel to the side edge of the upper block 17. During the movement, the optical unit 21 maintains the tilted position. In order to realize the movement, the rail 36 of the drive mechanism 35 extends parallel to the side edge of the upper block 17. Components and structures that are equivalent to those of the welding apparatus 15 of the first embodiment will be denoted by the same numerals.

Figure 15:
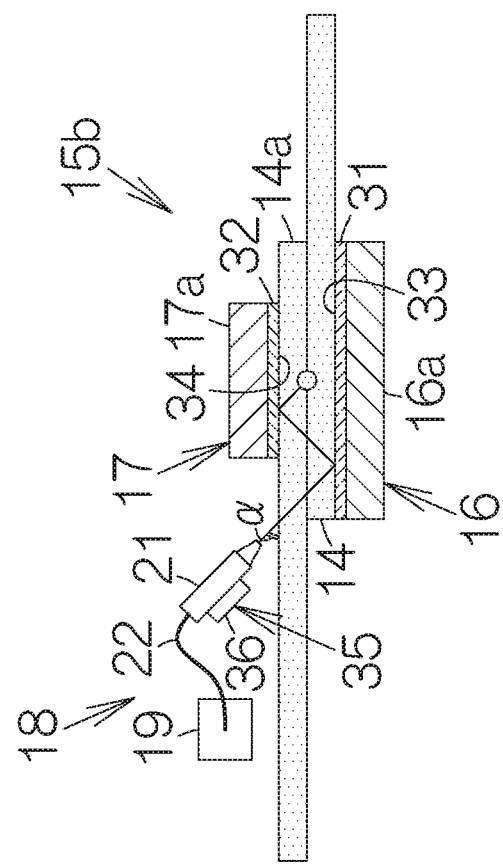
FIG. 15 illustrates a process in which a laser beam is focused on an interface between the first base material and the second base material between the first block and the second block.

It is assumed that the roll materials 14 and 14a are welded to each other using the welding apparatus 15b. As with the first and second embodiments, the trailing end of the roll material 14 and the leading end of the new roll material 14a are superposed on the reflective surface 33. The reflective surface 34 is received on the roll material 14a. At this time, the optical unit 21 emits a laser beam at the home position. The laser beam enters the roll material 14a from the front surface of the roll material 14a at the entry angle α. As illustrated in FIG. 15, the laser beam is reflected by the reflective surfaces 33 and 34. The laser beam is focused on the interface between the roll materials 14 and 14a. The roll materials 14 and 14a are heated at the focal point of the laser beam.

When melting starts at the interface between the roll materials 14 and 14a, the roll materials 14 and 14a become welded to each other at the interface. At this time, the optical unit 21 starts moving from the home position along the width of the roll materials 14 and 14a parallel to the front surface of the roll material 14a. As the focal point of the laser beam moves, the roll materials 14 and 14a become melted along the path of the focal point of the laser beam. When the optical unit 21 reaches the other edge of the upper block 17, emission of the laser beams is stopped. The roll materials 14 and 14a are cooled. The roll materials 14 and 14a are joined to each other.

In the manufacturing apparatus 15b, as with the first and second embodiments, the laser beam enters the roll material 14a from outside the reflective surface 34 through the front surface of the roll material 14a at the acute entry angle α. Therefore, dispersion and refraction of the laser beam are greatly reduced as compared with a case in which the laser beam is emitted toward the interface through the side surface of the roll materials 14 and 14a. The laser beam reaches the interface with high precision, so that welding can be performed efficiently. Moreover, the cost of welding is reduced because it is not necessary to dispose the absorber of the laser beam on the interface. In addition, the laser beam enters the roll materials 14 and 14a through the front surface of the roll material 14a from outside the outline of the reflective surface 34. At the positions corresponding to the focal points, the blocks 16 and 17 can securely apply a pressing force to the roll materials 14 and 14a. The roll materials 14 and 14a are welded to each other more firmly.

The upper block 17 and the lower block 16 have the same length along the width of the roll materials 14 and 14a. The optical unit 21 moves outside the outline of the reflective surface 34 along the side edge of the upper block 17. As a result, the focal point of the laser beam can move along the entire width of the roll material 14a, so that the roll materials 14 and 14a become welded to each other along the entire width of the roll materials 14 and 14a. The welding apparatus 15b can be efficiently used in the case when a sufficient welding strength is desired. Moreover, the welding apparatus 15b has a simple structure because the welding apparatus 15b includes only one laser beam emitting unit 18. The welding apparatus 15b can be produced at a lower cost than those of the welding apparatuses 15 and 15a.

In any of the welding apparatuses 15, 15a, and 15b, it is not necessary that the reflective surfaces 33 and 34 reflect a laser beam, as long as the laser beam emitting unit 18 focuses the laser beam between the lower block 16 and the upper block 17. The laser beam emitting unit 18 may focus a laser beam on the interface between the roll materials 14 and 14a without reflecting the laser beam with the reflective surfaces 33 and 34. Alternatively, the laser beam emitting unit 18 may focus the laser beam on the interface between the roll materials 14 and 14a by reflecting the laser beam with only the reflective surface 33. The reflective surfaces 33 and 34 may reflect the laser beam a plurality of times. The focal length of the laser beam is to be adjusted in accordance with the number of times the laser beam is reflected.

As heretofore described, resin materials can be welded to each other with high precision and at low cost by using the welding method according to the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A welding method comprising:
    sandwiching a first base material and a second base material between a first block and a second block, the first and second base materials being made of a light-transmitting resin; and
    welding the first and second base materials to each other by making a laser beam enter the second base material through a front surface of the second base material toward the first block from outside an outline of the second block at an acute entry angle with respect to the front surface of the second base material and by focusing the laser beam on the first and second base materials between the first and second blocks;
    wherein the laser beam is reflected by the first block and after the laser beam is reflected, the laser beam is focused on the first and second base materials to perform the welding.

2. The welding method according to claim 1,
    wherein the laser beam is reflected by the second block and focused on the first and second base materials.

3. The welding method according to claim 1, further comprising:
    moving a focal point of the laser beam along an interface between the first and second base materials.

4. The welding method according to claim 1, further comprising:
    moving a focal point of the laser beam along an optical axis of the laser beam.

5. A method of manufacturing a liquid crystal device, the method comprising:
    sandwiching a first base material and a second base material between a first blocks and a second block, the first and second base materials being made of a light-transmitting resin;
    welding the first and second base materials to each other by making a laser beam enter the second base material through a front surface of the second base material toward the first block from outside an outline of the second block at an acute entry angle with respect to the front surface of the second base material and by focusing the laser beam on the first and second base materials between the first and second blocks; and
    forming a conductor pattern for liquid crystal on the second base material that is being wound toward a winding reel.

6. The method of manufacturing a liquid crystal device according to claim 5,
    wherein the laser beam is reflected by the first block and focused on the first and second base materials.

7. The method of manufacturing a liquid crystal device according to claim 5,
    wherein the laser beam is reflected by the second block and focused on the first and second base materials.

8. The method of manufacturing a liquid crystal device according to claim 5, further comprising:
    moving a focal point of the laser beam along an interface between the first an second base materials.

9. The method of manufacturing a liquid crystal device according to claim 5, further comprising:
    moving a focal point of the laser beam along an optical axis of the laser beam.

* * * * *